United States Patent
Joyce et al.

(10) Patent No.: US 11,388,164 B2
(45) Date of Patent: Jul. 12, 2022

(54) DISTRIBUTED APPLICATION PROGRAMMING INTERFACE WHITELISTING

(71) Applicant: EMC IP Holding Company LLC, Hopkinton, MA (US)

(72) Inventors: Scott E. Joyce, Foxboro, MA (US); Norman M. Miles, Bedford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 194 days.

(21) Appl. No.: 16/529,918

(22) Filed: Aug. 2, 2019

(65) Prior Publication Data

US 2021/0037018 A1 Feb. 4, 2021

(51) Int. Cl.
*H04L 9/40* (2022.01)
*H04W 12/08* (2021.01)

(52) U.S. Cl.
CPC ........ *H04L 63/101* (2013.01); *H04L 63/0209* (2013.01); *H04W 12/08* (2013.01)

(58) Field of Classification Search
CPC ... H04L 63/101; H04L 63/0209; H04L 63/20; H04L 63/08; H04L 63/10; H04L 2463/082; H04L 63/123; H04L 67/02; H04L 9/3239; H04L 29/06; H04L 63/0807; H04L 63/0876; H04L 67/10; H04L 67/12; H04L 9/3213; H04L 2463/121; H04L 63/0281; H04L 63/0884; H04L 63/105; H04L 63/108; H04L 63/1433; H04L 67/1097; H04L 9/3234; H04L 9/3236; H04L 9/3271; H04L 12/14; H04L 12/2856;

(Continued)

(56) References Cited

U.S. PATENT DOCUMENTS 10,133,650 B1 * 11/2018 Park .................... G06F 11/3608
2015/0249672 A1 * 9/2015 Burns .................... G06F 21/629
726/4

(Continued)

OTHER PUBLICATIONS

Dell EMC, "A Proactive Monitoring and Analytics Application for Dell EMC Storage Systems," CloudIQ Detailed Review, Jan. 2019, 42 pages.

(Continued)

*Primary Examiner* — Djenane M Bayard

(74) *Attorney, Agent, or Firm* — Ryan, Mason & Lewis, LLP

(57) ABSTRACT

Techniques are provided to implement distributed application programming interface (API) whitelisting for access control of a computing system. For example, an API gateway receives a client API request to access an application comprising a distributed microservices architecture. The API gateway initiates a whitelisting validation operation determine if the client API request is permitted. The whitelisting validation operation includes comparing an API endpoint of the client API request to a whitelist of permitted API endpoints of registered microservices of the application to determine whether the API endpoint of the client API request comprises a permitted API endpoint in the whitelist. The API gateway routes the client API request to a target microservice of the application, in response to the whitelisting validation operation determining that the client API request is permitted.

20 Claims, 4 Drawing Sheets

(58) Field of Classification Search
CPC . H04L 2209/38; H04L 2209/56; H04L 41/00; H04L 41/22; H04L 43/00; H04L 43/04; H04L 43/045; H04L 43/08; H04L 43/10; H04L 43/12; H04L 61/2007; H04L 63/0227; H04L 63/0236; H04L 63/0815; H04L 63/102; H04L 63/083; H04L 67/2823; H04L 63/0428; H04L 63/0846; H04L 9/088; H04L 9/3228; H04L 2463/102; H04L 41/0893; H04L 41/5096; H04L 63/0892; H04L 67/125; H04L 9/0894; H04L 63/0414; H04L 63/068; H04L 63/0838; H04L 63/0853; H04L 65/1073; H04L 67/1095; H04L 67/146; H04L 67/32; H04L 9/3247; H04L 9/3263; H04L 41/145; H04L 41/28; H04L 41/5009; H04L 43/065; H04L 43/0817; H04L 61/106; H04L 63/0823; H04L 63/205; H04L 67/20; H04L 67/2861; H04L 67/34; H04L 67/38; H04L 67/40; H04L 67/42; H04L 9/0841; H04L 9/0891; H04L 9/30; H04L 29/06278; H04L 63/02; H04L 63/1408; H04L 63/0861; H04L 67/01; H04L 9/085; H04L 9/3231; H04L 9/3297; H04W 12/08; G06F 21/51

See application file for complete search history.

(56) References Cited

U.S. PATENT DOCUMENTS

| | | | | |
|---|---|---|---|---|
| 2016/0124742 | A1* | 5/2016 | Rangasamy | H04L 41/0803 717/103 |
| 2016/0277413 | A1* | 9/2016 | Ajitomi | H04L 63/105 |
| 2018/0121320 | A1* | 5/2018 | Dolby | G06F 11/3608 |
| 2019/0020665 | A1* | 1/2019 | Surcouf | H04L 9/3236 |
| 2020/0220948 | A1* | 7/2020 | Stalter | B60W 50/08 |
| 2020/0272912 | A1* | 8/2020 | Chacko | G06F 9/547 |
| 2020/0326913 | A1* | 10/2020 | Ying | G06F 9/54 |
| 2021/0021643 | A1* | 1/2021 | Nakagoe | H04L 67/34 |

OTHER PUBLICATIONS

Brian Cooksey, "An Introduction to APIs," Zapier, Inc., Apr. 23, 2014, 77 pages.

* cited by examiner

DISTRIBUTED APPLICATION PROGRAMMING INTERFACE WHITELISTING

FIELD

This disclosure relates generally to security for computing systems and, in particular, to security for distributed application programming interfaces (APIs) in cloud computing systems.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, Software-as-a-Service (SaaS), Infrastructure-as-a-Service (IaaS), and/or Platform-as-a-Service (PaaS). A cloud computing system implements an API to enable various applications and computing platforms to communicate with and access the cloud computing system, or otherwise allow other applications and computing platforms to integrate within the cloud computing system.

For example, cloud computing systems typically implement a Representational State Transfer (REST) API. As is known in the art, REST is an architectural style for building an API which defines a set of recommendations for designing loosely coupled applications that use the HTTP protocol for data transmission. A REST API architecture allows data-interchange in different formats such as plain text, HTML, XML, YAML, and JSON, etc. An API can be built using SOAP (Simple Object Access Protocol). SOAP is a standardized messaging protocol for interchanging data (via XML) in a decentralized and distributed environment using application layer protocols, such as HTTP, SMTP, TCP, or UDP.

The ubiquity in API implementation for cloud computing systems and enterprise networks has resulted in a significant increase in the use of APIs as critical attack vectors for cyber-attacks on such systems and networks. Indeed, sophisticated hackers continually try to exploit the vulnerabilities of APIs to gain unauthorized access to data and resources of cloud computing systems and enterprise networks.

SUMMARY

Exemplary embodiments of the disclosure include techniques for implementing distributed API whitelisting for access control of a computing system. For example, an API gateway receives a client API request to access an application comprising a distributed microservices architecture. The API gateway initiates a whitelisting validation operation determine if the client API request is permitted. The whitelisting validation operation comprises comparing an API endpoint of the client API request to a whitelist of permitted API endpoints of registered microservices of the application to determine whether the API endpoint of the client API request comprises a permitted API endpoint in the whitelist. The API gateway routes the client API request to a target microservice of the application, in response to the whitelisting validation operation determining that the client API request is permitted.

Other embodiments of the disclosure include, without limitation, computing systems and articles of manufacture comprising processor-readable storage media for implementing distributed API whitelisting for access control of a computing system.

DETAILED DESCRIPTION

Figure 1:
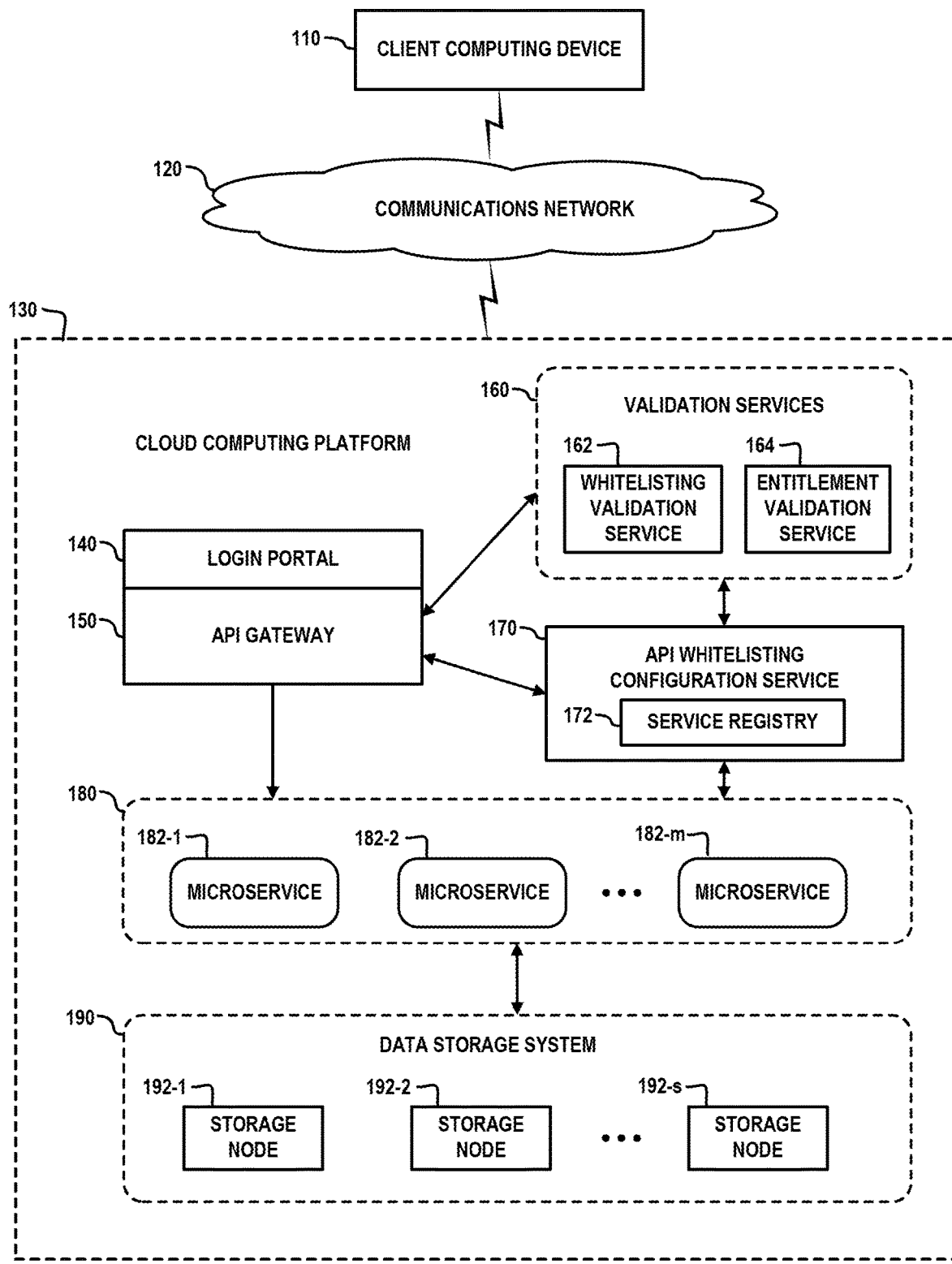
FIG. 1 is a high-level schematic illustration of a system which implements distributed API whitelisting for access control in a cloud computing environment, according to an exemplary embodiment of the disclosure.

Exemplary embodiments of the disclosure will now be described in further detail with regard to systems and methods for implementing distributed API whitelisting for access control of a computing system. For example, FIG. 1 is a high-level schematic illustration of a system 100 which implements distributed API whitelisting for access control in a cloud computing environment, according to an exemplary embodiment of the disclosure. The system 100 comprises a client computing device 110, a communications network 120, and a cloud computing platform 130. The cloud computing platform 130 comprises a user login portal 140, an API gateway 150, a plurality of validation services 160, an API whitelisting configuration service 170, an application platform 180, and a data storage system 190. The validation services 160 comprise a whitelisting validation service 162 and an entitlement validation service 164. The API whitelisting configuration service 170 comprises a service registry 172.

The client computing device 110 comprises one of various types of computing systems or devices such as a desktop computer, a laptop computer, a workstation, a computer server, an enterprise server, a rack server, a smart phone, an electronic tablet, etc., which can access the cloud computing platform 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols.

The cloud computing platform 130 is configured to perform data processing, data storage, and data management functions to support one or more cloud-based or web-based applications or services and/or other types of applications that are implemented by the application platform 180. The data storage system 190 comprises a plurality of data storage nodes 192-1, 192-2, . . . , 192-s (collectively, data storage nodes 192). The data storage system 190 can be implemented using any suitable data storage system, or combination of data storage systems, including, but not limited to storage area network (SAN) systems, Hadoop Distributed File System (HDFS), as well as other types of data storage systems comprising clustered or distributed virtual and/or physical infrastructure. In some embodiments, the data storage nodes 192 comprise storage appliances with memory controllers, processors, cache memory, and non-volatile storage media to provide persistent storage resources (e.g., file repositories, databases, etc.) for the application platform 180 and other computing nodes of the cloud computing platform 130.

The data storage devices of the data storage nodes 192 may include one or more different types of persistent storage devices, or data storage arrays, such as hard disk drives or solid-state drives, or other types and combinations of non-volatile memory. In one embodiment, the data storage nodes 192 are implemented using, for example, an enterprise-class storage platform comprising high-performance, scalable storage arrays, which can be implemented for hyper-scale computing systems. For example, the data storage system 190 can be implemented using commercially available storage array systems and applications of Dell EMC including, but not limited to, NSS, XtremIO, UNITY, VMAX, VNX, ScaleIO, etc.

In the exemplary embodiment of FIG. 1, the application platform 180 comprises a microservices-based architecture which includes plurality of microservices 182-1, 182-2, . . . , 182-m (collectively, microservices 182) that are combined to provide a structured application. As is known in the art, a microservices-based framework implements an application as a collection of loosely-coupled services, wherein the services expose fine-grained APIs and lightweight protocols. Each microservice 182-1, 182-2, . . . , 182-m comprises a self-contained software module with associated functionality and interfaces. In some embodiments, the microservice-based application platform 180 runs in a virtualized environment (e.g., virtual machines) or a containerized environment (e.g., containers) in which the number of instances of a given microservice and the locations (e.g., host and port) of such instances change dynamically.

In the microservices architecture, each microservice 182 (and instances thereof) exposes a set of fine-grained endpoints to access resources provided by the microservice. Each endpoint specifies a location from which APIs can access the resources needed to perform functions. Each microservice 182 maintains its own database in the data storage system 190 in order to be decoupled from other microservices. Data consistency between the distributed microservices 182 is implemented using known techniques such as the Saga pattern. The microservice-based framework enables the individual microservices 182 to be deployed and scaled independently, to be developed and updated in parallel by different teams and in different programming languages, and have their own continuous delivery and deployment stream.

While the application platform 180 is generically depicted in FIG. 1, the application platform 180 can implement any suitable cloud-based application. For example, in an exemplary embodiment, the application platform 180 implements the CloudIQ SaaS platform offered by Dell EMC. CloudIQ is a cloud-based application that allows that allows customers to monitor, analyze, and troubleshoot storage systems provided by Dell EMC such as Unity, SC Series, XtremIO, PowerMax/VMAX, etc. CloudIQ is an example of a SaaS application which comprises hundreds of microservices and associated endpoints. CloudIQ allows a consumer to utilize a HTML5 browser to monitor, analyze, and troubleshoot the consumer's storage environment from any location. While a common use of CloudIQ is to monitor the health of storage systems, CloudIQ is further configured to generate predictive analytics by using machine learning (ML) techniques to analyze historical data of systems and to offer best practices and learned knowledge of Dell EMC.

The login portal 140 and the API gateway 150 allow client applications running on client devices (e.g., client computing devices 110) to access the individual microservices 182 of the application platform 180. More specifically, the login portal 140 comprises a user interface which implements methods that allow a user to connect to the cloud computing platform 130 (via a computing device 110) and login to the cloud computing platform 130 and provide credentials for a user authentication/verification process. The API gateway 150 implements methods that are configured to enable client applications to access the services of the microservices-based application platform 180. In particular, the API gateway 150 provides a single entry point for client applications to issue API requests for services that that are provided by the application platform 180. The API gateway 150 abstracts the client applications from knowing how the application platform 180 is partitioned into microservices, and from having to determine the locations of service instances. The API gateway 150 comprises logic for calling one or more of the microservices 182 in response to a client request.

The API gateway 150 communicates with client applications and the microservices 182 using any suitable API framework. For example, in some embodiments, the API gateway 150 and the microservices 182 implement a REST API. In other embodiments, the API gateway 150 and the microservices 182 implement a SOAP API. While different APIs can be implemented, for illustrative purposes, exemplary embodiments of the disclosure will be discussed in further detail with regard to a REST API implementation.

In some embodiments, the API gateway 150 is implemented using a single gateway service that is configured to interface with many different types of client applications (e.g., web-based applications, mobile applications, etc.). In other embodiments, the API gateway 150 comprises a plurality of gateway services, each configured to interface with a different type of client application. In all instances, the API gateway 150 performs various functions. For example, the API gateway 150 functions as a reverse proxy to redirect or route requests from client applications to target endpoints of the microservices 182. In this instance, the API gateway 150 provides a single endpoint or Uniform Resource Locator (URL) to receive requests from client applications for access to services of the application platform 180, and internally maps client requests to one or more of the microservices 182.

Furthermore, the API gateway 150 implements aggregation services to aggregate multiple client requests (e.g., HTTP requests) which target multiple microservices 182 into a single request. In this instance, a client application may send a single request to the API gateway 150 to perform a single task, and the API gateway 150 dispatches multiple calls to different backend microservices 182 to execute the task. The API gateway 150 aggregates the results from the multiple microservices and sends the aggregated results to the client application. In this instance, the client application issues a single request and receives a single response from the API gateway 150 despite that the single request is parsed and processed by multiple microservices 182. The API gateway 150 can be configured to implement other functions or microservices to implement authentication and authorization, service discovery, response caching, load balancing, etc.

The validation services 160 and the API whitelisting configuration service 170 implement security measures to control access to the microservices 182 of the application platform 180 and thereby reduce the "attack vectors" of the application platform 180 and the cloud computing platform 130. An attack vector is a path or means by which a hacker can gain access to a computing system or network to, e.g., deliver a malicious payload such as a virus or otherwise exploit system vulnerabilities. The API whitelisting configuration service 170 implements methods for generating and dynamically updating a whitelist of known, valid API requests that are approved and permitted to be issued to microservices 182 of the application platform 180. In other words, the API whitelisting configuration service 170 is configured to generate a whitelist which comprises an index of known endpoints that are exposed by the microservices 182. It is to be understood that the term "whitelist" as used herein is to be broadly construed to mean any type of listing of known and valid endpoints that exist in a given computing system, irrespective of the methods and data structures utilized to generate and maintain such listing of known and valid endpoints.

In some embodiments, the API whitelisting configuration service 170 utilizes microservices registration information obtained by the service registry 172 to generate an API whitelist. The service registry 172 generates and maintains a database of microservices 182 of the application platform 180, including a list of all instances of the microservices 192 and the locations of all instances of the microservices 182. Each microservice 182 of the application platform 180 will maintain a list of its API endpoints (e.g., REST endpoints) including the paths, methods, headers, URL parameters, supported parameter values, etc., of valid API endpoints of the microservice 182. During service startup, the instances of the microservices 182 will push their API endpoint information to the service registry 172. The microservice instances are registered with the service registry 172 on startup and then deregistered on shutdown.

The microservices registration information is leveraged in various ways. For example, the API gateway 150 utilizes the registration information to identify available instances of the microservices 182 and their locations to support client request routing and load balancing functions. In addition, the API whitelisting configuration service 170 leverages the registration information to generate a detailed centralized whitelist of all permitted API endpoints exposed by the microservices 182 of the application platform 180. In particular, the whitelist represents a consolidated listing of valid and permitted API endpoints that are exposed by the microservices 182. The centralized whitelist of permitted API endpoints is dynamically updated on a continual basis as the individual microservices 182 are started, stopped, and updated over time. The whitelist of permitted API endpoints is utilized by the validation services 160 to perform security and access control functions to reduce the system attack vectors.

For example, the whitelisting validation service 162 implements methods that are configured to perform whitelisting operations on API requests that are received from client applications. The API gateway 150 will forward an incoming client API request to the whitelisting validation service 162 to determine if the client API request is valid before routing the client request to one or more microservices 182. In particular, the whitelisting validation service 162 performs a whitelisting validation operation which comprises comparing an API endpoint of the client API request to the whitelist of permitted API endpoints of registered microservices 182 of the application 180 to determine whether the API endpoint of the client API request comprises a permitted API endpoint in the whitelist. As explained in further detail below, the whitelisting validation service 162 can be configured to validate one or more portions of a client request including, but not limited to, (i) allowed URL paths, (ii) allowed HTTP methods, (iii) allowed URL parameters, (iv) allowed URL parameter values, and (v) allowed HTTP headers, etc. The whitelisting validation operations are configured to allow known and permitted API requests to be forwarded by the API gateway 150 to target microservices 182, while detecting and rejecting invalid, and non-permitted client API requests. In addition, the whitelisting validation service 162 is configured to track rejected or failed requests in a centralized location for further analysis to determine if such requests are associated with intentional malicious attacks, etc.

The entitlement validation service 164 implements methods that are configured to implement role-based access management operations. When a given microservice registers with the service registry 172, the microservice can provide metadata that specifies what entitlements or credentials a given client will actually need to call the microservice. The entitlement validation is performed to ensure that a given client can actually invoke and utilize a given endpoint of a given microservice irrespective of whether the client request is deemed by the whitelisting validation service 162 to be a valid and permitted request.

Figure 2:
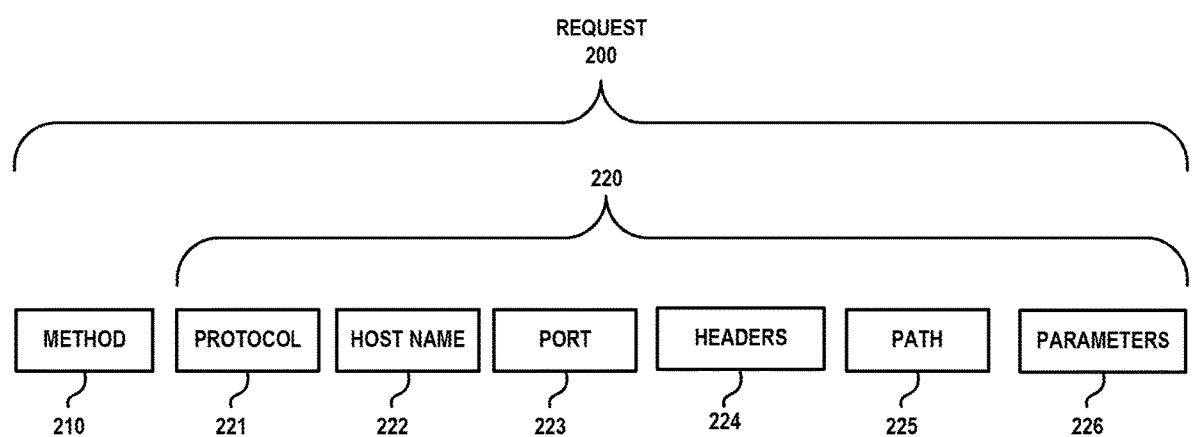
FIG. 2 illustrates elements of an API request which are analyzed by a whitelisting validation service for access control, according to an exemplary embodiment of the disclosure.

FIG. 2 illustrates elements of an API request 200 which are analyzed by a whitelisting validation service for access control, according to an exemplary embodiment of the disclosure. In a REST API framework, each resource is assigned to a resource URL. The resource URL comprises a base path and end path of the endpoint. The REST API defines what actions a client can be allowed to perform on the resources and what types of data are required for each action and the format of the data. As noted above, in some embodiments, each microservice 182 exposes REST API endpoints including the path, method, headers, URL parameters, and supported parameter values. As shown in FIG. 2, the API request 200 comprises a method 210 and URL string 220. The URL string 220 comprises a protocol 221, a host name 222, a port 223, headers 224, an endpoint path 225, and parameters 226. The URL string 220 specifies a given information resource that can be accessed through the URL string 220.

The URL string 220 is accompanied by a method 210 which specifies what action the client wants to be performed on a given resource. For example, common methods include GET, POST, PUT and DELETE. A GET method is utilized to retrieve a resource from a server (e.g., the server looks for data requested by the client and sends the requested data to the client). The GET method is a default method. A POST method is utilized to create a new resource on a server (e.g., create a new entry in a database). A PUT method is utilized to update a resource on a server (e.g., update an entry in a database). A DELETE method is utilized to delete a resource from a server (e.g., delete an entry in a database).

The endpoint of the client request 220 comprises a root endpoint and the endpoint path 225. The root endpoint comprises the protocol 221 (e.g., HTTP, HTTPS), the host name 222, and the port 223. The root endpoint (221, 222, and 223) comprises the base portion of the URL string 220 which directs the client request to the associated API gateway. The path 225 specifies the endpoint path of the particular resource that is being requested.

The headers 224 provide certain types of information to the server for particular purposes, e.g., supporting authentication operations, providing information about the body content, etc. The headers 224 are typically specified as property-value pairs or key-value pairs. The property or key portion specifies an attribute about an object, and the value specifies the value of the attribute. In some embodiments, an endpoint will require unique parameters to be passed in the header 224, and such parameters will be specifically defined by the API for the given endpoint.

The parameters 226 include path parameters that are included as part of the endpoint itself as well as parameters that specify information or data that the client sends to the server. The parameters 226 can be used in conjunction with the specified method 210. The parameters 226 include, for example, a query string and query parameters which are passed with the endpoint. The query string is the portion of the URL 220 which is used to pass data to the server, and the query parameters comprise one or more key-value pairs that are included in the query string. The parameters 226 can specify a response format or an amount of data returned, etc. As is known in the art, REST APIs use the query string to define query parameters of a search. The API of a given service will define what parameters are acceptable, and the exact names of those parameters which need to be used to execute the search.

For example, the following illustrates an endpoint:
http://apiserver.com/cars?limit=3&format=json
The exemplary endpoint includes the entire URL path to a given resource. The string http://apiserver.com denotes the base path (or base URL or host) and refers to a common path for the API (e.g., the API gateway). The string/cars refers to the end path of the endpoint. The string ?limit=3&format=json is the element of the endpoint which contains query string parameters for the endpoint. In this example, the endpoint accesses a "cars" information resource, and the default GET method would provide a response which limits the returned results to three cars, and the response would be returned in JSON format. As a further example, a URL may include multiple endpoints that refer to the same resource, e.g., http://apiserver.com/cars/{car id}. This URL includes an endpoint that accesses a car resource which has a given identifier {car id}.

Figure 3:
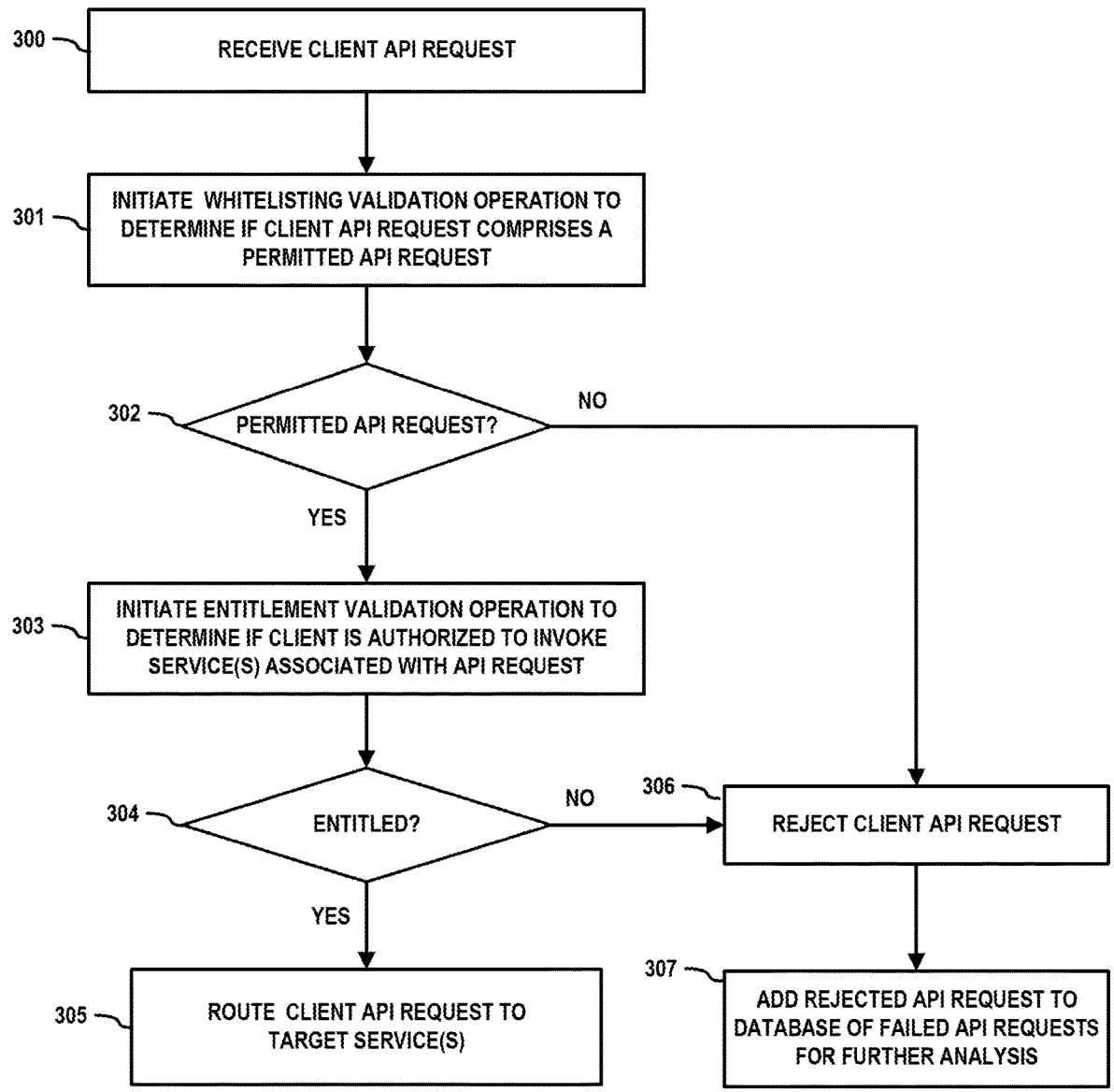
FIG. 3 is a flow diagram of method for implementing distributed API whitelisting for access control in a cloud computing environment, according to an embodiment of the disclosure.

The various elements of a client API request, such as shown in FIG. 2, can be analyzed against an API whitelist to determine if the API request is permitted. For example, FIG. 3 is a flow diagram of method for implementing distributed API whitelisting for access control in a cloud computing environment, according to an embodiment of the disclosure. For illustrative purposes, the method of FIG. 3 will be discussed in the context of the system 100 of FIG. 1 and the exemplary client request 200 of FIG. 2. Referring to FIG. 3, the API gateway 150 receives a client API request (block 300). In response to receiving the client request, the API gateway 150 initiates a whitelisting validation operation to determine if the client API request comprises a permitted API request (block 301). For example, in some embodiments, the API gateway 150 will forward the received client API request to a separate API whitelisting configuration service 170 with a request to perform the whitelisting validation operation on the received request. In other embodiments, the API gateway 150 will actually perform the whitelisting validation operation on the received API request in instances wherein the API gateway 150 implements such functionality.

The whitelisting validation operation comprises comparing the API request to a whitelist of known and permitted API requests associated with exposed API endpoints of registered services. In particular, the whitelisting validation operation comprises comparing an API endpoint of the client API request to a whitelist of permitted API endpoints of registered microservices of the application to determine whether the API endpoint of the client API request comprises a permitted API endpoint in the whitelist. In some embodiments, the whitelisting validation operation comprises parsing the API request into constituent elements (e.g., paths, methods, parameters) and analyzing the elements separately and/or in combination, against an API whitelist to determine whether or not such elements are valid. For example, the whitelisting validation operation can begin by comparing the URL path(s) (e.g., endpoint paths) of the given API request against permitted URL path(s) in the API whitelist to determine if the URL paths of the API request are allowed. If the URL paths of the given API request are deemed valid, then the whitelisting operations can proceed to compare other elements of the given API request to elements of permitted API request in the API whitelist to determine if the client API request is valid.

For example, the whitelisting validation operation can proceed to determine if the client API request comprises allowed methods, allowed URL parameters, allowed URL parameter values, and/or allowed headers, etc. There can be an instance where the endpoint paths for accessing a target resource are valid, while the specified methods for interacting with the target resource are not valid. In addition, there can be an instance where the specified endpoint paths and methods of the client API request are deemed valid, while the URL parameters of the client API request include one or more unsupported parameters. The parameters of the client API request can be compared to known valid parameters included in the whitelist or valid parameter expressions using regex (regular expressions) methods for analyzing the client API request for invalid patterns, etc. Further, the HTTP headers of the client API request can be compared against permitted headers to determine if the API request contains unsupported headers.

If the client API request is deemed to be a permitted API request, e.g., the client API request includes elements that are included in the current API whitelist (affirmative determination in block 302), the API gateway 150 will initiate an entitlement validation operation to determine if the requesting client (e.g., client application, end user, etc.) is authorized to invoke the service(s) associated with the client API request (block 303). For example, in some embodiments, the API gateway 150 will forward the received client API request to the separate entitlement validation service 164 with a request to perform the entitlement validation operation on the received client API request. In other embodiments, the API gateway 150 will actually perform the entitlement validation operation on the received API request in instances wherein the API gateway 150 implements such functionality.

The entitlement validation operation comprises comparing client credentials or identifiers to entitlement metadata that is contained in the whitelist for the API request to determine whether or not the given client is permitted or otherwise authorized to access the given services or resources associated with the API request. Indeed, as noted above, during service registration, a given microservice can specify access privileges for protected resources of the microservice and the credentials or privileges that a given client will need to invoke the microservice or particular resources (e.g., endpoints) of the microservice.

If the given client is deemed entitled to invoke the target microservice(s) or associated resources of the target microservice(s) (affirmative determination in block 304), the API gateway will route the client API request to the target microservice(s) to initiate execution of the task(s) associated with the client API request (block 305). In this instance, the API gateway 150 will access the service registry 172 to determine available instances of the target microservices(s) and the locations of such instances to perform the requisite load balancing and routing operations for handling the client API request.

On the other hand, if the client API request is deemed not to be a permitted API request (negative determination in block 302) or if the requesting client is deemed not to be entitled to invoking target services or resources associated with the API request (negative determination in claim 304), the client API request will be rejected (block 306) and an error message (e.g., HTTP status code) will be send from the API gateway 150 to the requesting client. The client API request will be rejected in response to the whitelist validation operation determining that an identified endpoint path of the client API request is not a permitted API endpoint path, or that an identified endpoint parameter of the client API request is not a permitted API endpoint parameter, or that an identified endpoint parameter value of the client API request is not a permitted API endpoint parameter value, or that an identified method of the client API request is not a permitted method, or that an identified header of the client API request is not a permitted header, etc. Moreover, in some embodiments, the rejected API request will be added to a database of failed API requests for further analysis (block 307). In this regard, API requests that fail whitelist validation or the entitlement validation can be tracked, maintained, and analyzed over time to identify potential security risks and attack vector patterns.

Figure 4:
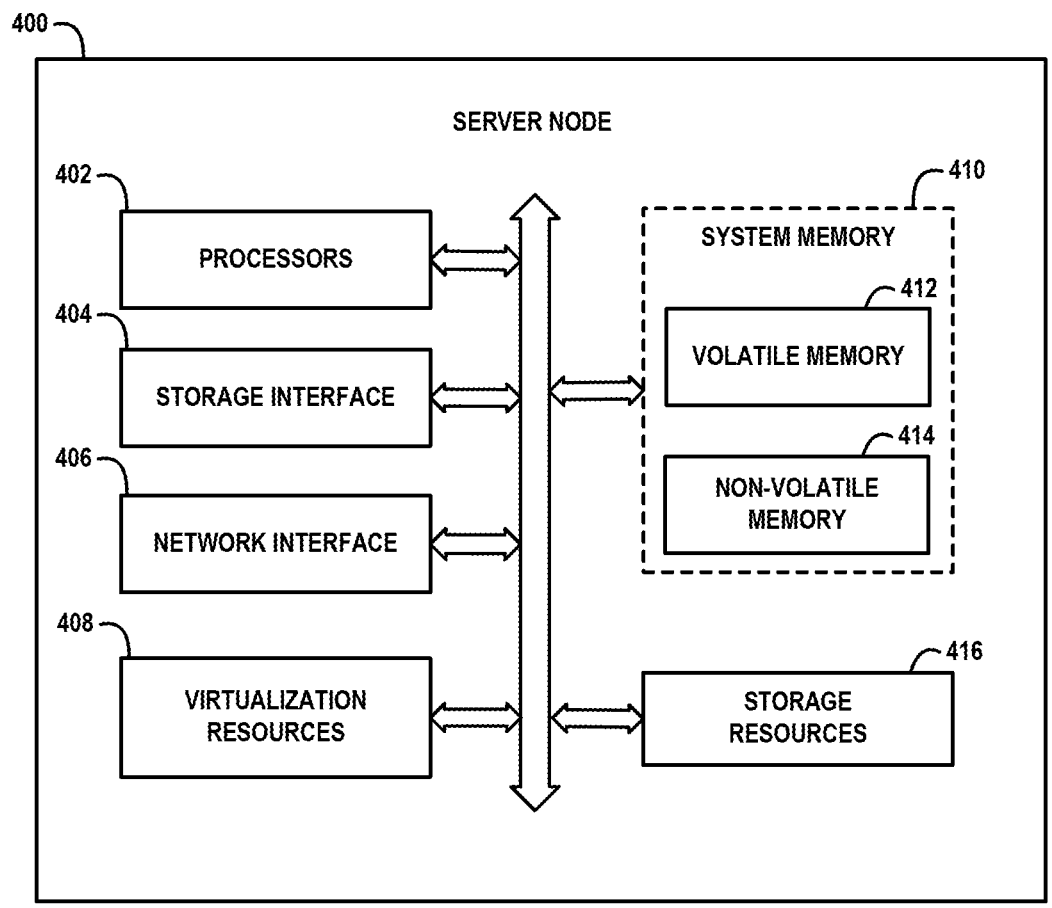
FIG. 4 schematically illustrates framework of a server node which can be implemented for hosting validation services for security and access control, according to an exemplary embodiment of the disclosure.

It is to be understood that the various software modules and services (e.g., elements 140, 150, 160, 170, 182, etc.) of the cloud computing platform 130 can be implemented in a distributed manner over a cluster of server nodes that reside in a single facility (e.g., single data center) or multiple facilities or remote locations. For example, FIG. 4 schematically illustrates framework of a server node 400 which can be implemented for hosting validation services for security and access control, according to an exemplary embodiment of the disclosure. The server node 400 comprises processors 402, storage interface circuitry 404, network interface circuitry 406, virtualization resources 408, system memory 410, and storage resources 416. The system memory 410 comprises volatile memory 412 and non-volatile memory 414.

The processors 402 comprise one or more types of hardware processors that are configured to process program instructions and data to execute a native operating system (OS) and applications that run on the server node 400. For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various modules and functionalities of the software modules/services 140, 150, 160, 170, 182, etc., of FIG. 1 as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the disclosure is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well the various modules and functionalities of the software modules/services 140, 150, 160, 170, 182, etc., of FIG. 1 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules/services 140, 150, 160, 170, 182, etc., of FIG. 1 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of a NAND Flash storage device, a SSD device, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
receiving, by an application programming interface (API) gateway, a client API request to access an application comprising a distributed microservices architecture;
initiating, by the API gateway, a whitelisting validation operation determine if the client API request is permitted, wherein the whitelisting validation operation comprises:
comparing an API endpoint of the client API request to a whitelist of permitted API endpoints of registered microservices of the application to determine whether the API endpoint of the client API request comprises a permitted API endpoint in the whitelist, wherein comparing comprises identifying an element of the client API request, wherein the identified element comprises at least one of an endpoint path, an endpoint parameter, an endpoint parameter value, a specified method of the client API request, and a header of the client API request;
utilizing the whitelist to determine whether the identified element is a permitted element of the client API request; and
rejecting the client API request in response to determining that the identified element is not a permitted element of the client API request; and
routing, by the API gateway, the client API request to a target microservice of the application, in response to the whitelisting validation operation determining that the client API request is permitted.

2. The method of claim 1, wherein initiating the whitelisting validation operation comprises sending, by the API gateway, the client API request to a centralized whitelisting validation service.

3. The method of claim 1, wherein:
identifying the element of the client API request comprises identifying an endpoint path of the client API request;

the whitelist is utilized to determine whether the identified endpoint path of the client API request is a permitted API endpoint path; and the client API request is rejected in response to determining that the identified endpoint path of the client API request is not a permitted API endpoint path.

4. The method of claim 1, wherein:

identifying the element of the client API request comprises identifying an endpoint parameter of the client API request;

the whitelist is utilized to determine whether the identified endpoint parameter of the client API request is a permitted API endpoint parameter; and the client API request is rejected in response to determining that the identified endpoint parameter of the client API request is not a permitted API endpoint parameter.

5. The method of claim 1, wherein:

identifying the element of the client API request comprises identifying an endpoint parameter value of the client API request;

the whitelist is utilized to determine whether the identified endpoint parameter value of the client API request is a permitted API endpoint parameter value; and the client API request is rejected in response to determining that the identified endpoint parameter value of the client API request is not a permitted API endpoint parameter value.

6. The method of claim 1, wherein:

identifying the element of the client API request comprises identifying a specified method of the client API request;

the whitelist is utilized to determine whether the identified method of the client API request is a permitted method for interacting with a resource that is accessed by a permitted endpoint of the client API request; and the client API request is rejected in response to determining that the identified method of the client API request is not a permitted method.

7. The method of claim 1, wherein:

identifying the element of the client API request comprises identifying a header of the client API request;

the whitelist is utilized to determine whether the identified header of the client API request is a permitted header; and the client API request is rejected in response to determining that the identified header of the client API request is not a permitted header.

8. The method of claim 1, comprising:

collecting, by a centralized service registry, registration information from a plurality of microservices within the distributed microservices architecture of the application, wherein the registration information comprises valid API endpoints exposed by the plurality of microservices; and utilizing, by a centralized API whitelisting configuration service, the collected registration information to generate the whitelist of permitted API endpoints of registered microservices.

9. The method of claim 1, comprising:

in response to the whitelisting validation operation determining that the client API request is permitted;

initiating, by the API gateway, an entitlement validation operation to determine if a client that issued the client API request is entitled to access a service or resource associated with the client API request, wherein the entitlement validation operation comprises comparing client credentials or identifiers of the client to entitlement metadata that is contained in the whitelist of permitted API endpoints of the registered microservices to determine whether the client is entitled to access the service or resource associated with the client API request; and rejecting the client API request in response to determining that the client is not entitled to access the service or resource associated with the client API request.

10. An article of manufacture comprising a non-transitory processor-readable storage medium having stored therein program code of one or more software programs, wherein the program code is executable by one or more processors to implement a method comprising:

receiving, by an application programming interface (API) gateway, a client API request to access an application comprising a distributed microservices architecture;

initiating, by the API gateway, a whitelisting validation operation determine if the client API request is permitted, wherein the whitelisting validation operation comprises:

comparing an API endpoint of the client API request to a whitelist of permitted API endpoints of registered microservices of the application to determine whether the API endpoint of the client API request comprises a permitted API endpoint in the whitelist, wherein comparing comprises identifying an element of the client API request, wherein the identified element comprises at least one of an endpoint path, an endpoint parameter, an endpoint parameter value, a specified method of the client API request, and a header of the client API request;

utilizing the whitelist to determine whether the identified element is a permitted element of the client API request; and rejecting the client API request in response to determining that the identified element is not a permitted element of the client API request; and routing, by the API gateway, the client API request to a target microservice of the application, in response to the whitelisting validation operation determining that the client API request is permitted.

11. The article of manufacture of claim 10, wherein initiating the whitelisting validation operation comprises sending, by the API gateway, the client API request to a centralized whitelisting validation service.

12. The article of manufacture of claim 10, wherein:

identifying the element of the client API request comprises identifying an endpoint path of the client API request;

the whitelist is utilized to determine whether the identified endpoint path of the client API request is a permitted API endpoint path; and the client API request is rejected in response to determining that the identified endpoint path of the client API request is not a permitted API endpoint path.

13. The article of manufacture of claim 10, wherein:

identifying the element of the client API request comprises identifying an endpoint parameter of the client API request;

the whitelist is utilized to determine whether the identified endpoint parameter of the client API request is a permitted API endpoint parameter; and the client API request is rejected in response to determining that the identified endpoint parameter of the client API request is not a permitted API endpoint parameter.

14. The article of manufacture of claim 10, wherein:
identifying the element of the client API request comprises identifying an endpoint parameter value of the client API request;
the whitelist is utilized to determine whether the identified endpoint parameter value of the client API request is a permitted API endpoint parameter value; and
the client API request is rejected in response to determining that the identified endpoint parameter value of the client API request is not a permitted API endpoint parameter value.

15. The article of manufacture of claim 10, wherein:
identifying the element of the client API request comprises identifying a specified method of the client API request;
the whitelist is utilized to determine whether the identified method of the client API request is a permitted method for interacting with a resource that is accessed by a permitted endpoint of the client API request; and
the client API request is rejected in response to determining that the identified method of the client API request is not a permitted method.

16. The article of manufacture of claim 10, wherein:
identifying the element of the client API request comprises identifying a header of the client API request;
the whitelist is utilized to determine whether the identified header of the client API request is a permitted header; and
the client API request is rejected in response to determining that the identified header of the client API request is not a permitted header.

17. The article of manufacture of claim 10, wherein the program code is executable by the one or more processors to implement a method comprising:
collecting, by a centralized service registry, registration information from a plurality of microservices within the distributed microservices architecture of the application, wherein the registration information comprises valid API endpoints exposed by the plurality of microservices; and
utilizing, by a centralized API whitelisting configuration service, the collected registration information to generate the whitelist of permitted API endpoints of registered microservices.

18. The article of manufacture of claim 10, wherein the program code is executable by the one or more processors to implement a method comprising:
in response to the whitelisting validation operation determining that the client API request is permitted;
initiating, by the API gateway, an entitlement validation operation to determine if a client that issued the client API request is entitled to access a service or resource associated with the client API request, wherein the entitlement validation operation comprises comparing client credentials or identifiers of the client to entitlement metadata that is contained in the whitelist of permitted API endpoints of the registered microservices to determine whether the client is entitled to access the service or resource associated with the client API request; and
rejecting the client API request in response to determining that the client is not entitled to access the service or resource associated with the client API request.

19. A server node, comprising:
at least one processor; and
system memory configured to store program code, wherein the program code is executable by the at least one processor to instantiate an application programming interface (API) gateway, wherein the API gateway is configured to:
receive a client API request to access an application comprising a distributed microservices architecture;
initiate a whitelisting validation operation determine if the client API request is permitted, wherein the whitelisting validation operation comprises:
comparing an API endpoint of the client API request to a whitelist of permitted API endpoints of registered microservices of the application to determine whether the API endpoint of the client API request comprises a permitted API endpoint in the whitelist, wherein comparing comprises identifying an element of the client API request, wherein the identified element comprises at least one of an endpoint path, an endpoint parameter, an endpoint parameter value, a specified method of the client API request, and a header of the client API request;
utilizing the whitelist to determine whether the identified element is a permitted element of the client API request; and
rejecting the client API request in response to determining that the identified element is not a permitted element of the client API request; and
route the client API request to a target microservice of the application, in response to the whitelisting validation operation determining that the client API request is permitted.

20. The server node of claim 19, wherein the API gateway is configured to initiate the whitelisting validation operation by sending the client API request to a centralized whitelisting validation service.

* * * * *